United States Patent
Johnsen

[15] 3,665,388
[45] May 23, 1972

[54] TIRE AIR PRESSURE DETECTION AND SIGNALLING DEVICE

[72] Inventor: Erich Cornelius Johnsen, Victoria, B. C., Canada

[73] Assignee: Eltico Manufacturing Ltd., Victoria, British Columbia, Canada

[22] Filed: Aug. 12, 1969

[21] Appl. No.: 849,397

[52] U.S. Cl.................................................340/58, 180/103
[51] Int. Cl..............................................................B60c 23/06
[58] Field of Search....................................340/58; 180/103

[56] References Cited

UNITED STATES PATENTS

| | | | |
|---|---|---|---|
| 3,092,806 | 6/1963 | Field | 340/58 |
| 3,249,916 | 5/1963 | Quinn | 340/58 |
| 3,283,300 | 11/1966 | Hartmann | 340/58 |
| 3,374,460 | 3/1968 | Massoubre | 340/58 |

Primary Examiner—John W. Caldwell
Assistant Examiner—Glen R. Swann, III
Attorney—Fleit, Gipple & Jacobson

[57] ABSTRACT

An apparatus for detecting dangerous deflation of automobile tires and for signaling the existence of the deflation. A sensor in the form of an inductance device is positioned at a fixed distance from the axis of rotation of the wheel. A metallic annulus is carried within the tire casing and is moved away from the sensor to change the reactance of the inductance when the tire is dangerously deflected. The change of inductance is used to operate a relay for operating a signaling device.

2 Claims, 10 Drawing Figures

Patented May 23, 1972

INVENTOR
ERICH C. JOHNSEN

BY *Fleit, Gipple & Jacobson*
ATTORNEYS

Patented May 23, 1972

INVENTOR
ERICH C. JOHNSEN

BY Fleit, Gipple & Jacobson
ATTORNEYS

Patented May 23, 1972 3,665,388

INVENTOR
ERICH C. JOHNSEN

BY Fleit, Gipple & Jacobson
ATTORNEYS 3,665,388

TIRE AIR PRESSURE DETECTION AND SIGNALLING DEVICE

BACKGROUND AND SUMMARY OF THE INVENTION

This invention relates to a detection device and more particularly to a device for detecting the deflation of an automobile tire.

Devices for detecting the deflation of automobile tires are not new, but commonly operate on the principle of measuring the pressure of the tires. Apparatus for measuring tire pressure on a rotating wheel is a complex device and is subject to road hazards, such as flying stones, which can render the apparatus inoperative or uncertain in operation.

It is an object of this invention to provide a detection device for detecting the deflation of automobile tires without measuring the pressure of the tire.

It is a further object to produce a detection device as aforesaid that is simple in structure and can be applied to existing automotive apparatus.

It is a further object to produce a device as aforesaid which has a high degree of safety from road hazards.

It is a further object of this invention to produce a device as aforesaid which will provide an indication that the tire has been deflated by a dangerous amount.

BRIEF DESCRIPTION OF THE DRAWING

The above and other objects of the invention will become manifest upon reading the following description in conjunction with the accompanying drawing wherein.

DETAILED DESCRIPTION

In accordance with the invention a sensor in the form of an induction element is secured to the wheel at a fixed distance from the center of rotation. A current is supplied to each sensor to form a flux field that intercepts the plane of rotation of the tire. An inductance modifier in the form of an annulus is mounted inside the tire casing to intercept the flux field when the tire is properly inflated but will not intercept the field when the tire is deflated an amount to constitute a danger to the operation of the vehicle. The change of inductance of the sensor by the position of the modifier is used to operate a signaling device.

Figure 1:
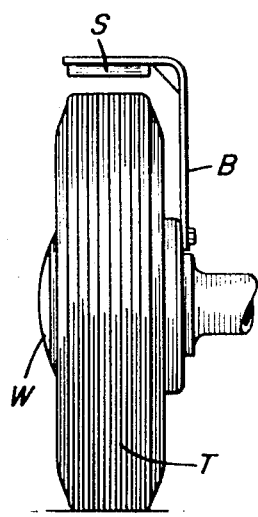
FIG. 1 is an end view showing the mounting of the sensor with relation to the tire.

With reference to the drawing, there is illustrated in FIG. 1 a tire T mounted on a wheel W of a wheeled vehicle such as an automobile. A bracket B is secured to the wheel mounting means and has secured thereto a sensor S in the form of an induction device which comprises a wire loop of a number of turns of wire 2 in a copper tubing ring 4 embedded in a plastic case 6.

An elastomeric ring 8 of a plastic foam having a flexible, gas impervious skin 10 is mounted in the tire to contact the inner surface of the tread portion. A number of arcuate metallic plates 12 are embedded in the ring 8 for a reason that will be explained below.

Figure 3:
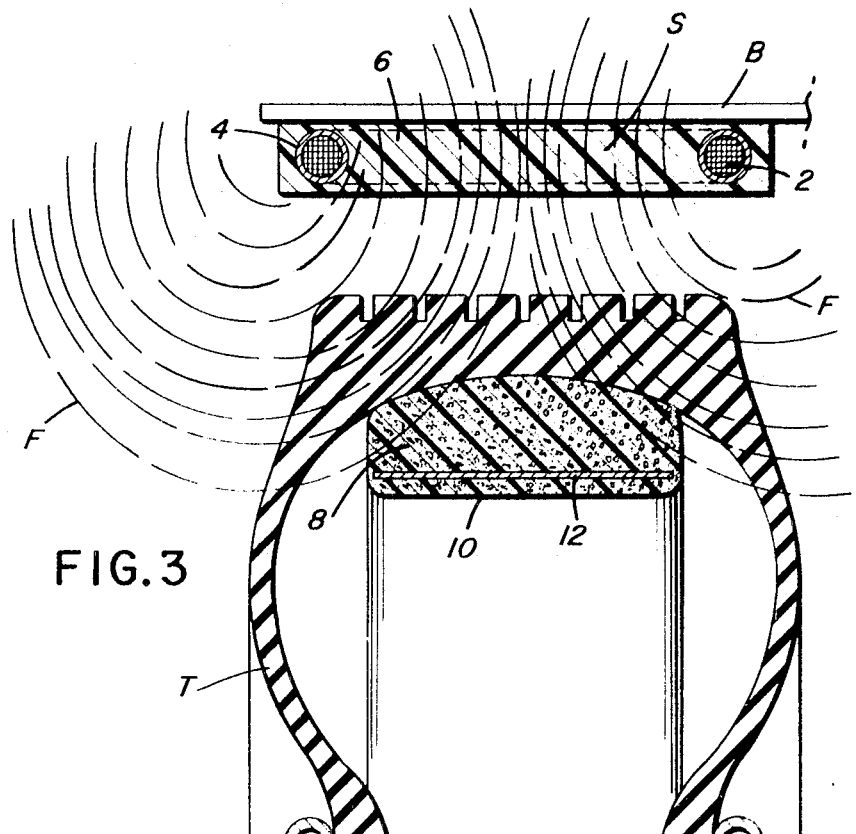
FIG. 3 is a partial transverse section illustrating a tubeless tire before inflation with the inductance modifier ring beyond the flux field.
Figure 2:
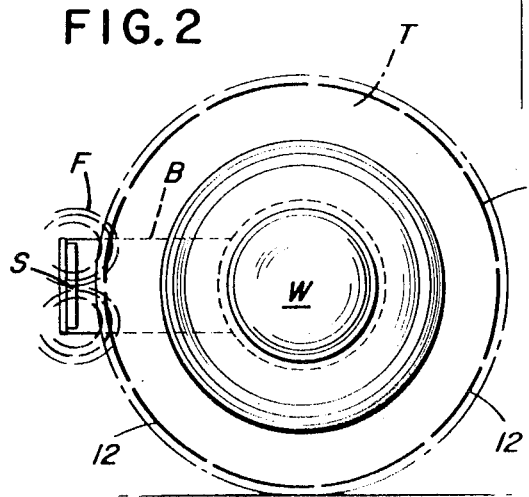
FIG. 2 is a side view of FIG. 1.

An electric current is supplied to the wire loop by means of leads 11 and 13 to form a flux field having lines of flux F extending through a peripheral zone of the tire. In the uninflated condition of the tire the plates are not within the flux field as is illustrated in FIGS. 3 and 5. In the inflated condition of the tire the plates are in the flux field as illustrated in FIGS. 4 and 6.

Figure 4:
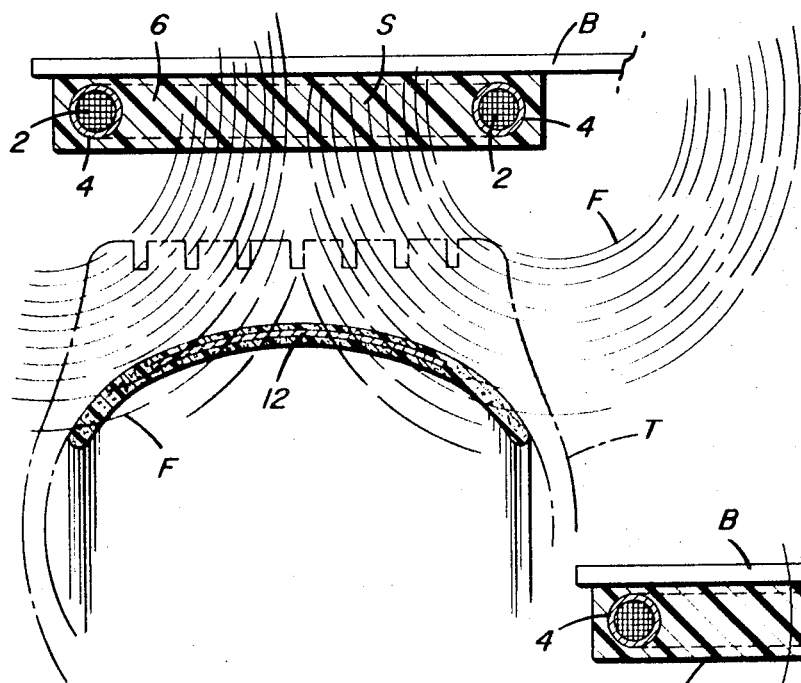
FIG. 4 is a view similar to FIG. 3 showing the modifier in the inflated tire.
Figure 5:
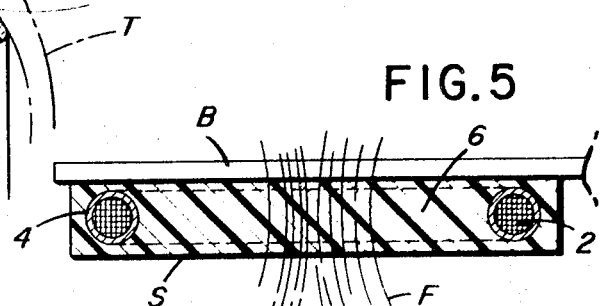
FIG. 5 illustrates a second form of the invention in which the modifier is used with a tire having an inner tube.

The use of the invention in a tubeless tire is illustrated in FIGS. 3 and 4. In this form of the invention the gas impervious skin 10 prevents the high pressure air used in inflating the tire from penetrating into the elastomeric annulus. The annulus is therefore collapsed by the inflating air to the condition shown in FIG. 4.

Figure 6:
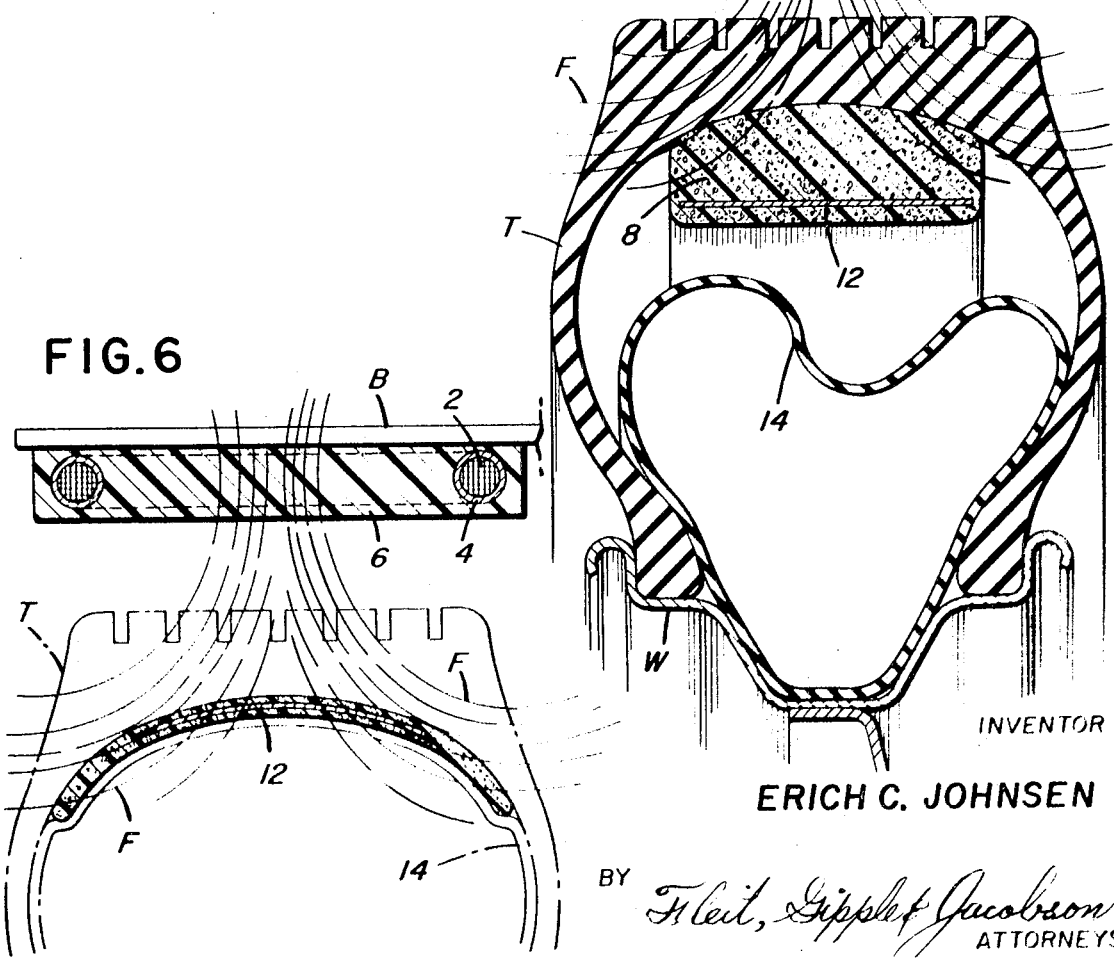
FIG. 6 is a view similar to FIG. 5 in which the tube is inflated.

The use of the invention with a tire provided with a tube is illustrated in FIGS. 5 and 6. In this form of the invention the gas impervious skin is not necessary since the annulus is in the space between the tube 14 and the tire. The air used in inflating the tire presses the tube against the annulus to collapse it into the condition illustrated in FIG. 6.

Figure 10:
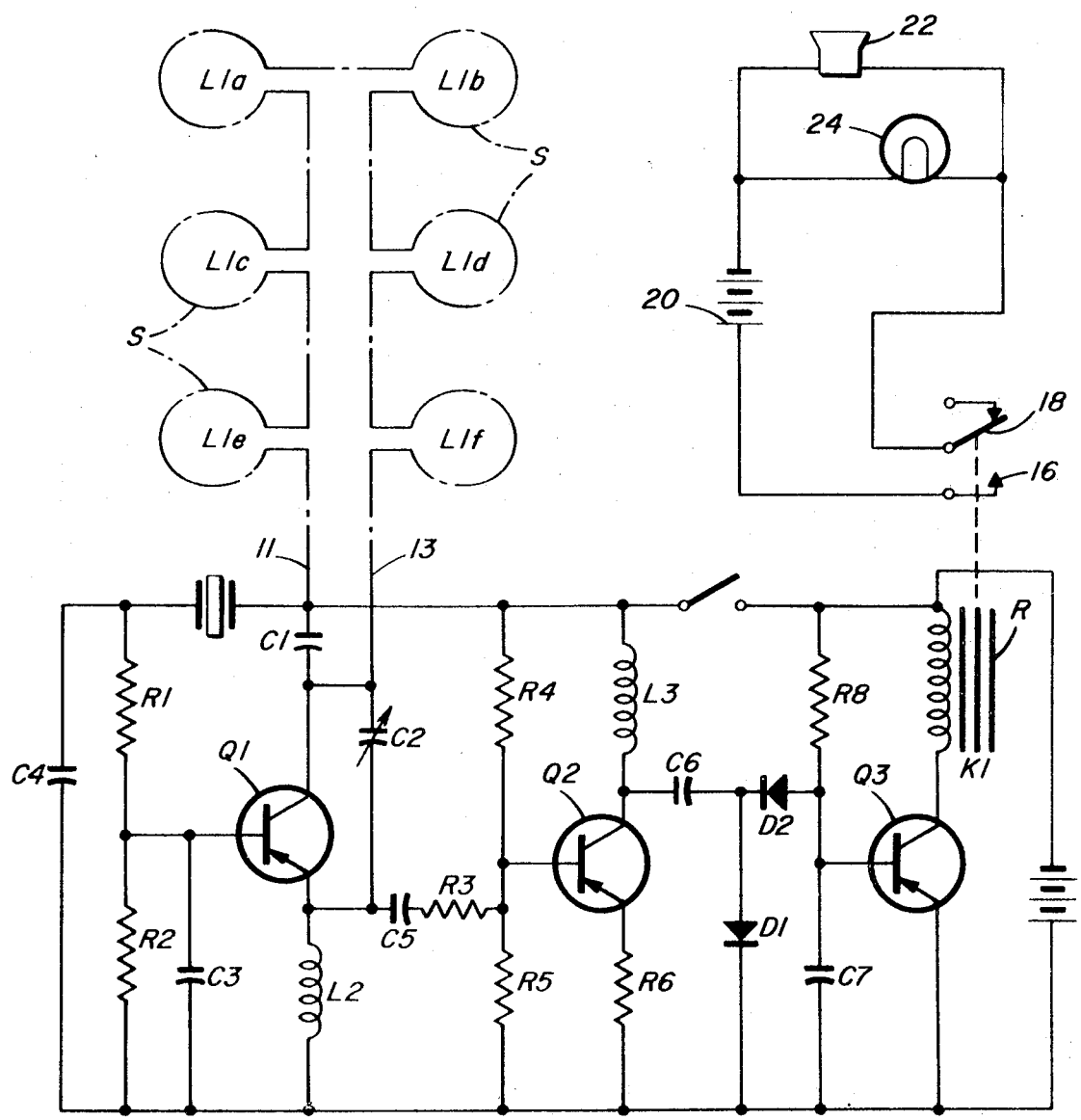
FIG. 10 is a circuit for sensing the deflation of a tire and producing a signal to indicate that a tire is deflated.

In FIG. 10 there is disclosed a sensing circuit for detecting the change in the reactance of the sensors S caused by the metal segments leaving the flux field when the tire is deflated a preselected amount. The change in reactance will turn off transistor Q3 to de-energize relay R and close contacts 16 and 18. Closing of the contacts will complete parallel circuits through a source of current, such as a battery 20, and a buzzer 22 and light 24 to indicate that the pressure in the tire has been reduced to an unsafe amount.

The circuit disclosed in FIG. 10 consists of an oscillator comprising a transmitter Q, inductance S, capacitors C1, C2, C3, C4, inductance L2 and resistors R1 and R2. The voltage developed across the voltage divider (S, C1, Q1, L2) is proportional to the amplitude of oscillations developed in tank S, C1. As the metal within the tire is brought in the flux field of the sensors, the inductance of the coils approaches the LC ratio set by the lumped capacitance across the tank and the oscillations approach maximum amplitude. A portion of the voltage developed across L2 is coupled to the amplifier stage by C5 and R3. The amplifier stage (Q2, R4, R5, R6 and L3) amplifies the signal and applies it to the voltage-double rectifier (D1, D2, C6, C7). The oscillations in the tank and the voltage of the emitter of Q1 are at maximum values and are amplified at the second stage (Q2) and rectified by D1, D2, C6, C7. When the metal within the tire approaches the flux lines of sensor coils S, the amplitude of the oscillations of tank S-C1 is reduced and a lower output is developed at the emitter of Q1.

When the metal in the tire is not within the flux field of sensor coils S, the polarity of the voltage developed at the base of Q3 is positive. The base-emitter junction of Q3 is then reverse biased and the collector current is insufficient to energize the relay.

Figure 7:
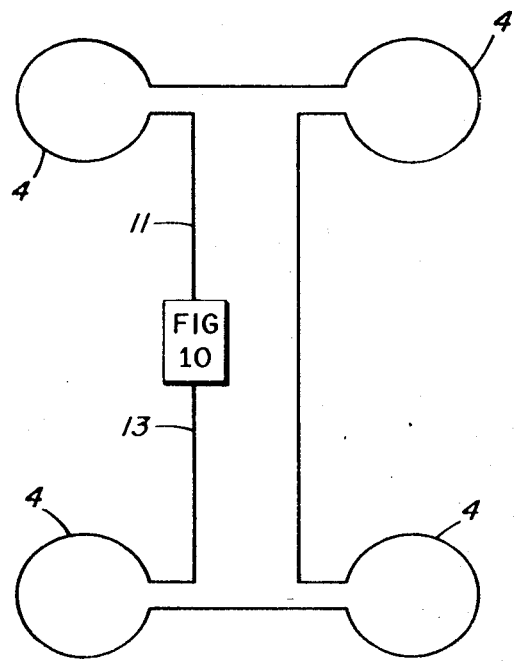
FIG. 7 is a schematic view illustrating the use of a single detection circuit.

In FIG. 7 a single sensing and indicating device of FIG. 10 is in series circuit with the sensors which are positioned adjacent the four wheels of the vehicle. A selected deflation of any single tire will operate the indicating device.

Figure 8:
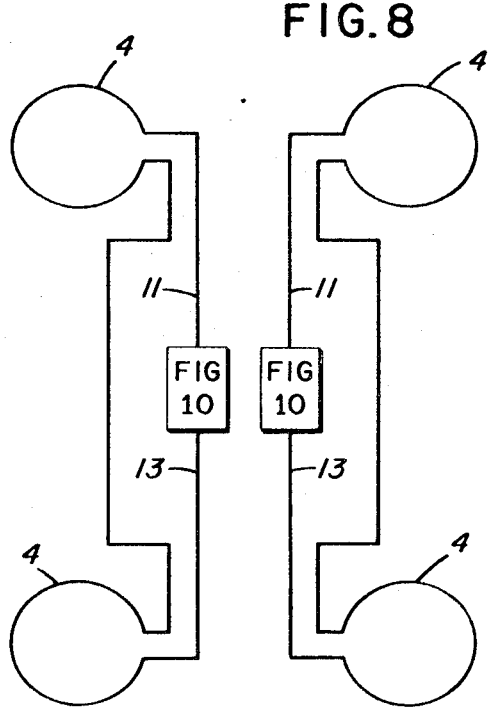
FIG. 8 is a schematic view illustrating the use of a detection circuit for each side of the vehicle.

In FIG. 8 a sensing and indicating device is in series with the sensors positioned adjacent the wheels on one side of the vehicle. This arrangement can be used to indicate which pair of wheels is provided with the underinflated tire.

Figure 9:
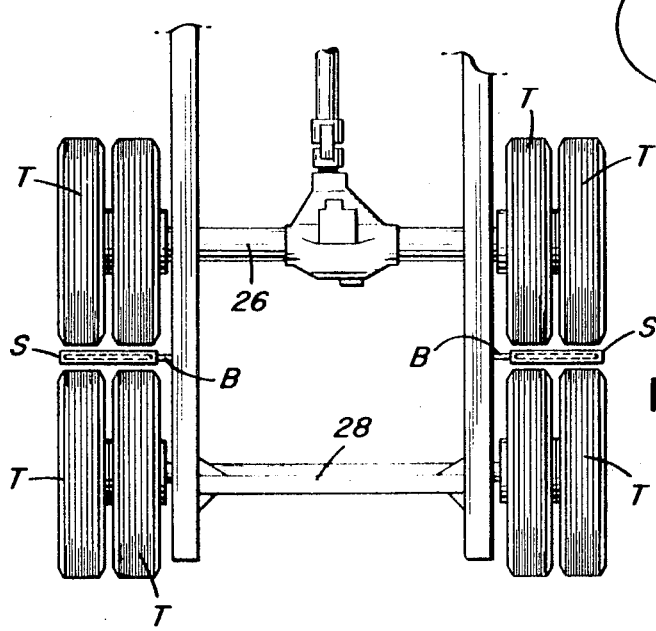
FIG. 9 is a view showing the use of a single sensor for four tires of a dual wheel truck.

In FIG. 9 a single sensor is positioned between the tires and fixed between the axles 26 and 28. In this form of the invention the indicator will indicate a preselected deflation of any one of the four tires.

While rings 12 have been disclosed as arcuate segments, it is within the scope of the invention to use a plurality of irregularly shaped pieces of metal or to embed metallic dust in the elastomeric annulus. The use of other elastomeric materials is also contemplated in lieu of a plastic foam and the use of a single sensing and indicating units for each tire.

What is claimed is

1. A tire deflation detection apparatus comprising an inductor device, means carried by the tire for changing the reactance of said inductor device upon a preselected deflation of the tire, and means responsive to the change of reactance for indicating said change, the means for changing the reactance comprising an annulus of metal elements and means responsive to the pressure in the tire for changing the diameter of the annulus so that the annulus is alternatively within and without the flux field of the device dependent on the occurrence of said preselected deflation.

2. An apparatus as defined in claim 1, wherein the annulus of metal elements are arcuate segments embedded in an annulus of elastomeric material.

* * * * *